Dec. 23, 1952     J. L. PAUL     2,622,332
TRAMMEL TYPE COMPARATOR WITH DIAL INDICATOR
Filed May 16, 1949
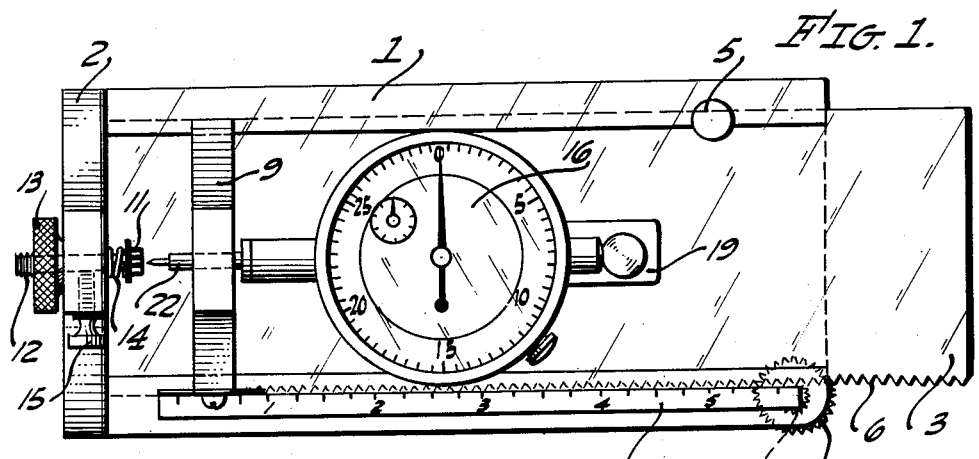
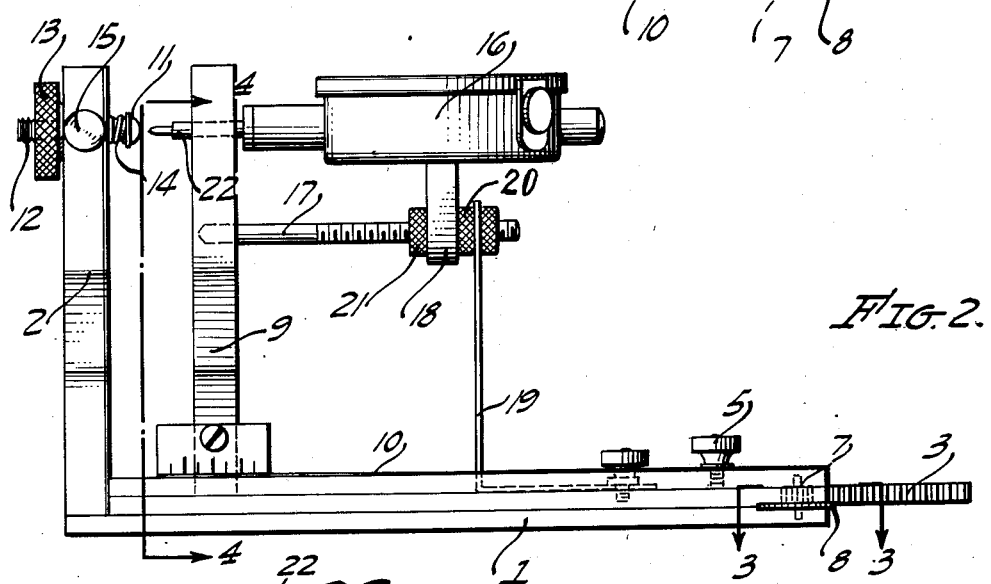
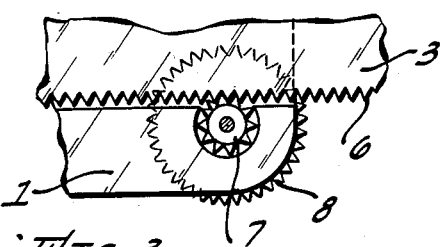
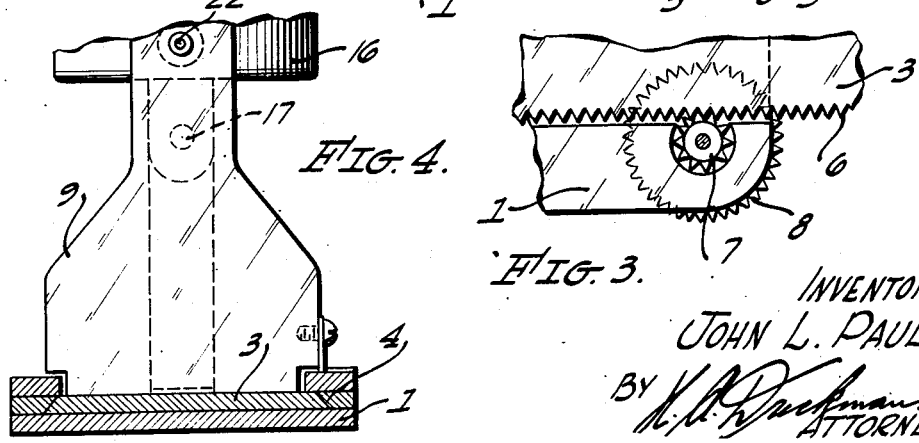
INVENTOR.
JOHN L. PAUL,
BY
ATTORNEY.

Patented Dec. 23, 1952

2,622,332

UNITED STATES PATENT OFFICE 2,622,332

TRAMMEL TYPE COMPARATOR WITH DIAL INDICATOR

John L. Paul, Long Beach, Calif.

Application May 16, 1949, Serial No. 93,508

1 Claim. (Cl. 33—147)

This invention relates to an indicator type of snap gauge, and particularly applicable to threads, although other objects may be gauged, if desired, other than threaded objects.

An object of my invention is to provide a novel indicator type of snap gauge in which the gauge may be accurately set and wherein the size of the object to be gauged can be accurately determined as to whether it is over or under the correct size.

Another object of my invention is to provide a novel indicator type of snap gauge of the character stated, in which the indicator is adjustably mounted on the movable plate.

A feature of my invention resides in the combination of a snap gauge with a manual means to accurately adjust the table on which the indicator is mounted.

Other objects, advantages and features of invention may appear from the accompanying drawing, the subjoined detailed description and the appended claim.

In the drawing:

Figure 1 is a top plan view of my indicator type of snap gauge.

Figure 2 is a side elevation of the same.

Figure 3 is a fragmentary sectional view taken on line 3—3 of Figure 2.

Figure 4 is a fragmentary sectional view taken on line 4—4 of Figure 2.

Referring more particularly to the drawing, the numeral 1 indicates a base at one end of which a stationary vertical wall 2 is provided. A table 3 is mounted for horizontal sliding movement in the base 1 and this table is formed with tapered edges which fit into a complementary groove 4 on each side of the base 1. A clamp screw 5 is threaded into the base and bears against the edge of the table 3, thus holding this table in any of its adjusted positions.

The table 3 may be adjusted in the following manner:

Rack teeth 6 are cut in one edge of the table and a pinion gear 7 meshes with this rack. A wheel 8 is secured to the pinion 7 and this wheel may be rotated by the operator to move the pinion 7 and thus slide the table 3 horizontally as required. A vertical plate 9 rises from the inner end of the table 3 and is fixedly secured to this table or may be an integral part thereof.

A scale 10 is mounted on one edge of the base 1 and the table 3 can be adjusted along this scale, thus setting the gauge thickness, as will be subsequently described.

A head 11 is mounted in the wall 2 and includes a threaded shank 12, which extends through this wall. A nut 13 screws on to the shank, thus adjusting this shank and the head 11 horizontally relative to the wall. A spring 14 presses the head 11 towards the plate 9, thus enabling the operator to adjust the head 11 relative to the plate 9 and especially where a fine or accurate adjustment is desired. A set screw 15 in the wall 2 engages the shank 12 and holds the head 11 in its adjusted position.

A circular gauge or indicator 16 is mounted on the plate 9 in the following manner:

A threaded stud 17 projects horizontally from the plate 9 and this stud extends through a boss 18 on the bottom of the indicator. The outer end of the stud 17 is supported in a bracket 19 on the table 3. The boss 18 may be adjusted horizontally on the stud 17 and thus the indicator 16 may be moved horizontally due to the nuts 20—21, which are threaded on to the stud and bear against the boss 18, thus adjustably mounting the indicator on the stud. The operating finger 22 of the indicator 16 extends through the plate 9 and is positioned opposite the head 11, substantially as shown. The object to be gauged is inserted between the head 11 and the finger 22 and any size over the fixed distance between these numbers is indicated on the gauge 16 by movement of the end of the gauge, all of which is usual and well known.

It will be evident that the spacing of the head 11 and the finger 22 can be accomplished with great accuracy in my device, and, furthermore, the use of a circular gauge or indicator will immediately show any plus size of the object to be measured. If the object is minus, it will pass between the head 11 and the finger 22 and is normally discarded. The indicator hand can be set at the minus quantity permitted for the object tested, and when this object is tested the permissible minus measurement will be shown as well as the permissible plus measurement.

Having described my invention, I claim:

An indicator type of snap gauge comprising a rectangular base, a fixed wall rising vertically from one end of the base, a rectangular table slidably mounted in the base, said base having grooves therein to receive the table, a vertical plate rising from one end of the table and fixedly attached thereto, a head mounted in said wall adjacent the top thereof, a threaded shank on the head, a nut threaded on the shank and bearing against the wall, a spring bearing against the head and urging said head away from the wall, a set screw in the wall bearing against the shank, an indicator arranged horizontally and positioned above the table, a gauge finger extending from the indicator through said plate and in juxtaposition to the head, a stud extending horizontally from the plate and fixedly attached to the plate, a boss depending from the indicator, said stud extending through the boss, nuts threaded on the stud and bearing against each side of the boss to hold the indicator in position relative to the plate, a rack on said table, and a gear journalled in the base and engaging said rack.

JOHN L. PAUL.

REFERENCES CITED

The following references are of record in the file of this patent:

UNITED STATES PATENTS

| Number | Name | Date |
| --- | --- | --- |
| 1,478,954 | Hardaker | Dec. 25, 1923 |
| 1,769,129 | Graham | July 1, 1930 |
| 2,209,020 | Billman et al. | July 23, 1940 |
| 2,325,170 | Bauer | June 29, 1942 |
| 2,344,498 | Coward | Mar. 21, 1944 |

FOREIGN PATENTS

| Number | Country | Date |
| --- | --- | --- |
| 231,061 | Germany | Feb. 14, 1911 |